(12) United States Patent
Kudou

(10) Patent No.: US 9,724,774 B2
(45) Date of Patent: Aug. 8, 2017

(54) PROGRAM CREATING DEVICE FOR WIRE ELECTRIC DISCHARGE MACHINE

(71) Applicant: FANUC Corporation, Yamanashi (JP)

(72) Inventor: Takehiro Kudou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 395 days.

(21) Appl. No.: 14/474,444

(22) Filed: Sep. 2, 2014

(65) Prior Publication Data

US 2015/0066192 A1    Mar. 5, 2015

(30) Foreign Application Priority Data

Sep. 3, 2013 (JP) .................................. 2013-182117

(51) Int. Cl.
*G06F 19/00*    (2011.01)
*B23H 1/02*    (2006.01)
*B23H 7/06*    (2006.01)
*G05B 19/4093*    (2006.01)
*B23H 11/00*    (2006.01)

(52) U.S. Cl.
CPC ................. *B23H 1/02* (2013.01); *B23H 7/06* (2013.01); *G05B 19/40937* (2013.01); *B23H 11/003* (2013.01); *G05B 2219/45221* (2013.01); *Y02P 90/265* (2015.11)

(58) Field of Classification Search
CPC ...... G05B 2219/50297; G05B 19/4103; G05B 19/4086; G05B 2219/45043; G05B 11/01; G05B 19/402; G05B 19/4097; G05B 19/41; G05B 19/4155; G05B 2219/33263; G05B 2219/33269; G05B 2219/34089; G05B 2219/49344; B23H 11/003; B23H 1/00; B23H 1/02; B23H 2500/20; B23H 7/06

See application file for complete search history.

(56) References Cited

U.S. PATENT DOCUMENTS

| | | | |
|---|---|---|---|
| 2005/0161441 A1 | 7/2005 | Takayama et al. | |
| 2007/0068905 A1 | 3/2007 | Miyajima et al. | |
| 2008/0086230 A1* | 4/2008 | Maeda ............. | G05B 19/40937 700/187 |

(Continued)

FOREIGN PATENT DOCUMENTS

| | | |
|---|---|---|
| CN | 1647882 A | 8/2005 |
| CN | 1939631 A | 4/2007 |

(Continued)

OTHER PUBLICATIONS

Office Action mailed Jan. 13, 2015, corresponding to Japanese patent application No. 2013-182117.

(Continued)

*Primary Examiner* — Darrin Dunn
(74) *Attorney, Agent, or Firm* — Hauptman Ham, LLP

(57) ABSTRACT

When graphic information is selected, program creating unit receives machining shape data from graphic information analysis unit and pivot axis information from rotation center storage unit. Based on the received data, the program creating unit generates a new amount of movement of a wire electrode relative to a workpiece and the amounts of rotation of pivots, used to machine the workpiece with the wire electrode held vertical.

7 Claims, 10 Drawing Sheets

POINTS OF INTERSECTION OF WORKPIECE TOP SURFACE AND WIRE ELECTRODE: Pt0, Pt1

POINTS OF INTERSECTION OF WORKPIECE BOTTOM SURFACE AND WIRE ELECTRODE: Pb0, Pb1

(56) References Cited

U.S. PATENT DOCUMENTS

| | | | | |
|---|---|---|---|---|
| 2009/0065483 | A1* | 3/2009 | Hayashi | B23H 7/065 219/69.17 |
| 2012/0001583 | A1* | 1/2012 | Otsuki | G05B 19/404 318/632 |
| 2012/0312786 | A1* | 12/2012 | Arakawa | B23H 7/06 219/69.11 |
| 2013/0060373 | A1* | 3/2013 | Otsuki | G05B 19/404 700/114 |
| 2013/0116816 | A1* | 5/2013 | Otsuki | G05B 19/416 700/159 |
| 2013/0211577 | A1 | 8/2013 | Yamane et al. | |

FOREIGN PATENT DOCUMENTS

| | | |
|---|---|---|
| CN | 101604344 A | 12/2009 |
| CN | 102019473 A | 4/2011 |
| CN | 103240471 A | 8/2013 |
| DE | 102011108282 A1 | 2/2012 |
| EP | 2295180 A2 | 3/2011 |
| JP | 62-68226 A | 3/1987 |
| JP | 63-191518 A | 8/1988 |
| JP | 8-323548 A | 12/1996 |
| JP | 2004-148423 A | 5/2004 |
| JP | 2012-254505 A | 12/2012 |

OTHER PUBLICATIONS

Decision to Grant a Patent mailed Apr. 28, 2015, corresponding to Japanese patent application No. 2013-182117.

Extended European Search Report issued Apr. 8, 2015, corresponding to European patent application No. 14182149.6.

Ren Fujin et al., "The Universal Mathematical Models of Spatial Curved Surface in Cartesian Coordinates with NC-WEDM-HS", Industrial Technology, 2008, ICIT 2008, IEEE International Conference On, IEEE, Piscataway, NJ, USA, Apr. 21, 2008, pp. 1-6.

* cited by examiner

POINTS OF INTERSECTION OF WORKPIECE TOP SURFACE AND WIRE ELECTRODE: Pt0、Pt1

POINTS OF INTERSECTION OF WORKPIECE BOTTOM SURFACE AND WIRE ELECTRODE: Pb0、Pb1

θroty : TILT ANGLE OF WIRE ELECTRODE TO X-AXIS DIRECTION

<CONVENTIONAL TAPER MACHINING>

<TAPER MACHINING IN ONE EMBODIMENT>

EXAMPLE OF WIRE GUIDE WITH SMALL CURVATURE RADIUS

·BENT NOT LUBRICIOUSLY
·WIRE VIBRATION
·UNSTABLE MACHINING

EXAMPLE OF WIRE GUIDE WITH LARGE CURVATURE RADIUS

·BENT LUBRICIOUSLY
·STABLE MACHINING
·LARGE SUPPORTING POINT ERROR

<CONVENTIONAL TAPER MACHINING>

<TAPER MACHINING IN ONE EMBODIMENT>

PROGRAM CREATING DEVICE FOR WIRE ELECTRIC DISCHARGE MACHINE

RELATED APPLICATIONS

The present application claims priority to Japanese Application Number 2013-182117, filed Sep. 3, 2013, the disclosure of which is hereby incorporated by reference herein in its entirety.

BACKGROUND OF THE INVENTION

Field of the Invention

The present invention relates to a program creating device for a wire electric discharge machine, furnished with a loading unit capable of arbitrarily tilting a workpiece using two or more pivots.

Description of the Related Art

FIG. 12 illustrates taper machining in which an upper guide portion is moved parallel to a table surface in a wire electric discharge machine so that a wire electrode 4 supported by a wire guide portion is stretched obliquely relative to a vertical direction 5. In the conventional taper machining, as shown in FIG. 12, a workpiece 3 placed on a table 2 is discharge-machined with the wire electrode 4 tilted relative to the vertical direction 5.

The taper machining in which the wire electrode 4 is stretched obliquely relative to the vertical direction 5 has more technical problems than vertical machining in which the wire electrode 4 is stretched vertically. The major problems are as follows:

(1) The machining speed cannot be increased due to difficulties in discharging sludge.

(2) The wire guide portion applies frictional force, thereby adversely affecting the surface roughness.

(3) Since supporting points of the wire electrode bent by the wire guide portion vary depending on the shape precision of the guide portion and the state of the guide portion during the machining, high-precision is difficult.

(4) It is difficult to set machining conditions.

These problems are caused because the wire electrode is obliquely stretched and they become more serious as the taper angle increases.

Thereupon, Japanese Patent Application Laid-Open No. 2012-254505 discloses a wire electric discharge machine that comprises a table having a plane and a coordinate system based on two orthogonal axes and configured to carry a workpiece thereon. This discharge machine performs electric discharge machining while relatively moving a wire electrode and the workpiece according to a machining program. The wire electric discharge machine comprises a loading unit, tilt angle setting unit, coordinate system conversion unit, and machining command value correction unit. The workpiece is placed on the loading unit so that it is tilted relative to the plane of the table. The tilt angle setting unit sets a tilt angle between the plane and the tilted workpiece on the loading unit. The coordinate system conversion unit tilts the coordinate system at the set tilt angle. The machining command value correction unit corrects a machining command value commanded by the machining program.

The wire electric discharge machine disclosed in Japanese Patent Application Laid-Open No. 2012-254505 is configured to machine the workpiece tilted at a fixed angle so that the tilt of the wire electrode can be reduced to solve the problems of the tilt machining. In reality, however, the wire electrode is inevitably tilted, though slightly. Thus, the aforementioned problems attributable to the oblique stretching of the wire electrode cannot be fully avoided.

SUMMARY OF THE INVENTION

Accordingly, the object of the present invention is to provide a machining program creating device used for a wire electric discharge machine, which is furnished with a loading unit capable of arbitrarily tilting a workpiece using two or more pivots, and configured to create a program for machining performed while changing the tilt of the workpiece relative to the wire electrode.

A machining program creating device according to the present invention is configured for a wire electric discharge machine, which comprises at least two linear axes for relative movement of a table and a wire electrode and a loading unit mounted on the table, capable of being fitted with a workpiece, and comprising at least two pivots. The machining program creating device comprises graphic data input unit configured to input graphic data defining a product shape, machining data setting unit configured to set machining data including at least the thickness of the product shape and an amount of tilt of the wire electrode, machining shape creating unit configured to create a machining shape based on the input graphic data and the machining data, and program creating unit configured to create a machining program according to which, the tilt of the workpiece relative to the wire electrode is changed for machining by synchronously moving the linear axes and the pivots, based on the created machining shape.

The program creating unit may create the machining program according to which, a new amount of movement of the wire electrode relative to the workpiece and the amounts of rotation of the pivots, used to machine the workpiece with the wire electrode held vertical, is generated based on the amount of tilt of the wire electrode, the amounts of movement of the linear axes of the wire electrode relative to the workpiece, and previously stored rotation center lines of the pivots, and the new amount of movement of the wire electrode relative to the workpiece and the amounts of rotation of the pivots are commanded. Further, a rotation matrix may be obtained based on the amounts of tilt of the rotation center lines and the wire electrode relative to a vertical line, and the amount of movement of the wire electrode relative to the workpiece and the amounts of rotation of the pivots may be obtained based on the rotation matrix.

The machining program creating device for a wire electric discharge machine may comprise a program input unit for inputting the machining program and a program conversion unit configured to convert a tilt command for the wire electrode and a command for the movement of the wire electrode relative to the workpiece to a command for the movement of the wire electrode relative to the workpiece and commands for the rotation of the pivots, based on the amount of tilt of the wire electrode in the input machining program, the amounts of movement of the linear axes of the wire electrode relative to the workpiece, and previously stored rotation center lines of the pivots.

According to the present invention arranged in this manner, there can be provided a machining program creating device used for a wire electric discharge machine, which is furnished with a loading unit capable of arbitrarily tilting a workpiece using two or more pivots, and configured to create a program for machining performed while changing the tilt of the workpiece relative to the wire electrode. Thus, the problem caused by oblique stretching of the wire electrode can be avoided, so that the accuracy of taper machining can be improved.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

In a few embodiments of the present invention, the tilt of a workpiece to be machined is changed with a wire electrode held in a vertical position during the machining. The following is a description of a case where a workpiece 3 is machined into the shape shown in FIG. 1. The vertical position or direction may be a substantially vertical position or direction at a taper angle of, for example, 5°.

According to the conventional taper machining technique, the wire electrode 4 is initially located at a machining start point 8. Then, the tilt of the wire electrode 4 is changed in the direction of a Y-axis as the workpiece top and bottom sides of the wire electrode 4 move toward points Pt1 and Pt2, respectively.

In wire electric discharge machining, taper machining is performed with the wire electrode 4 held in the vertical position. The following is a description of a taper machining method according to at least one embodiments of the present invention. FIG. 2 is a diagram in which the workpiece 3 is viewed in the negative direction of an X-axis in FIG. 1. FIG. 3 is a diagram in which the workpiece 3 is viewed in the positive direction of the Y-axis in FIG. 1. The workpiece 3 is assumed to be tiltable about rotation axes 6 and 7, which pass through a point Pb and orthogonally intersect a YZ-plane (FIG. 2) and an XZ-plane (FIG. 3).

Figure 1:
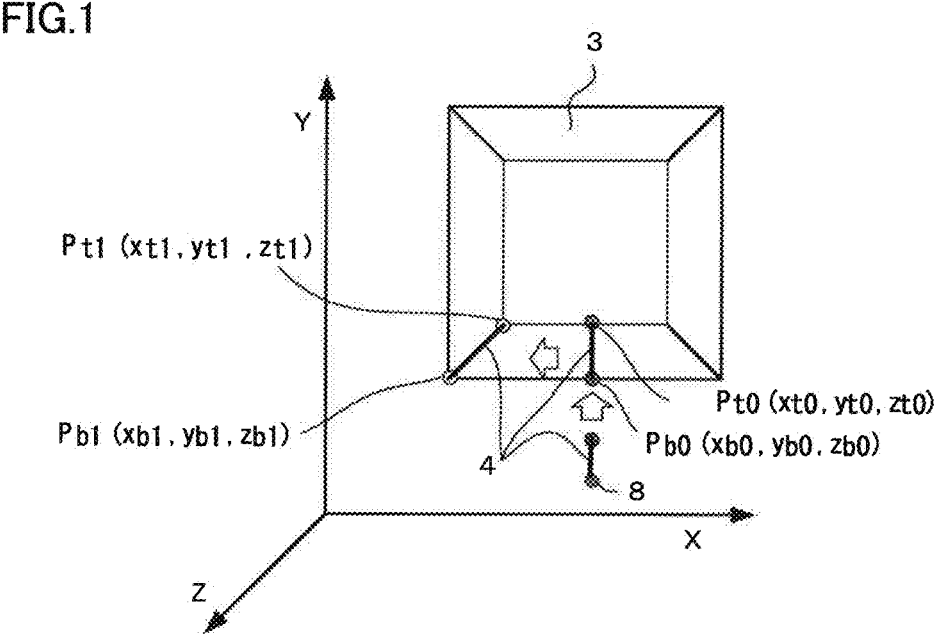
FIG. 1 is a diagram illustrating an example in which a workpiece placed on an X-Y table is taper-machined by tilting a wire electrode.
Figure 2:
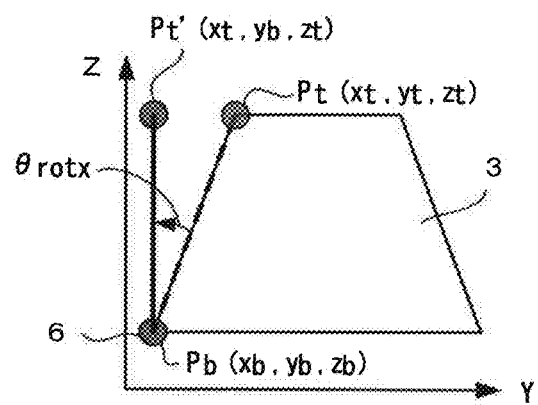
FIG. 2 is a diagram in which the workpiece is viewed in the negative direction of an X-axis in FIG. 1.
Figure 3:
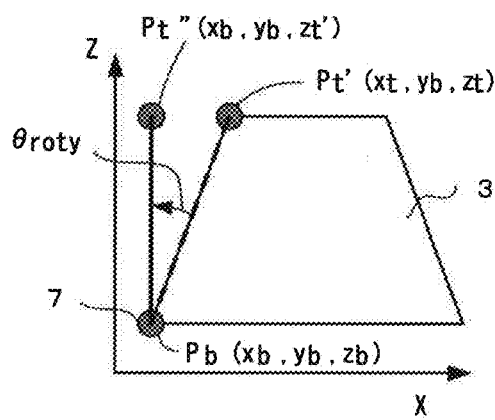
FIG. 3 is a diagram in which the workpiece is viewed in the positive direction of a Y-axis in FIG. 1.

FIG. 2 shows the points Pt and Pb projected to the YZ-plane of FIG. 1. To make the wire electrode 4 parallel to a Z-axis or the vertical direction in FIG. 2, the wire electrode 4 must be tilted at an angle θrotx about the point Pb. If the point of intersection of the wire electrode 4 and the top surface of the workpiece 3 is Pt', the angle θrotx can be given by equation (1) as follows:

$$\theta_{rotx} = \tan^{-1}((y_t - y_b)/(z_t - z_b)) \quad (1)$$

If a rotation matrix about the rotation axis 6 that passes through the point Pb and orthogonally intersects the YZ-plane is Mrotx, it can be given by equation (2) as follows:

$$M_{rotx} = \begin{bmatrix} 1 & 0 & 0 \\ 0 & \cos\theta_{rotx} & -\sin\theta_{rotx} \\ 0 & \sin\theta_{rotx} & \cos\theta_{rotx} \end{bmatrix} \quad (2)$$

$$= \begin{bmatrix} 1 & 0 & 0 \\ 0 & \cos\left(\tan^{-1}\left(\frac{y_t - y_b}{z_t - z_b}\right)\right) & -\sin\left(\tan^{-1}\left(\frac{y_t - y_b}{z_t - z_b}\right)\right) \\ 0 & \sin\left(\tan^{-1}\left(\frac{y_t - y_b}{z_t - z_b}\right)\right) & \cos\left(\tan^{-1}\left(\frac{y_t - y_b}{z_t - z_b}\right)\right) \end{bmatrix}$$

Thus, the point Pt' can be obtained by equation (3) as follows:

$$P'_t = M_{rotx} \times (P_t - P_b) + P_b = \quad (3)$$

$$\begin{bmatrix} 1 & 0 & 0 \\ 0 & \cos\left(\tan^{-1}\left(\frac{y_t - y_b}{z_t - z_b}\right)\right) & -\sin\left(\tan^{-1}\left(\frac{y_t - y_b}{z_t - z_b}\right)\right) \\ 0 & \sin\left(\tan^{-1}\left(\frac{y_t - y_b}{z_t - z_b}\right)\right) & \cos\left(\tan^{-1}\left(\frac{y_t - y_b}{z_t - z_b}\right)\right) \end{bmatrix} \times (P_t - P_b) + P_b$$

Then, FIG. 3 shows the points Pt and Pb projected to the XZ-plane of FIG. 1. To make the wire electrode 4 parallel to the Z-axis in FIG. 3, the wire electrode 4 must be tilted at an angle θroty about the point Pb. If the point of intersection of the wire electrode 4 and the top surface of the workpiece 3 is Pt", the angle θroty can be given by equation (4) as follows:

$$\theta_{roty} = \tan^{-1}((x_t - x_b)/(z_t - z_b)) \quad (4)$$

If a rotation matrix about the rotation axis 7 that passes through the point Pb and orthogonally intersects the XZ-plane is Mroty, it can be given by equation (5) as follows:

$$M_{roty} = \begin{bmatrix} \cos\theta_{roty} & 0 & \sin\theta_{roty} \\ 0 & 1 & 0 \\ -\sin\theta_{roty} & 0 & \cos\theta_{roty} \end{bmatrix} \quad (5)$$

$$= \begin{bmatrix} \cos\left(\tan^{-1}\left(\frac{x_t - x_b}{z_t - z_b}\right)\right) & 0 & \sin\left(\tan^{-1}\left(\frac{x_t - x_b}{z_t - z_b}\right)\right) \\ 0 & 1 & 0 \\ -\sin\left(\tan^{-1}\left(\frac{x_t - x_b}{z_t - z_b}\right)\right) & 0 & \cos\left(\tan^{-1}\left(\frac{x_t - x_b}{z_t - z_b}\right)\right) \end{bmatrix}$$

Thus, the point Pt" can be obtained by equation (6) as follows:

$$P''_t = M_{roty} \times P'_t = \begin{bmatrix} \cos\left(\tan^{-1}\left(\frac{x_t - x_b}{z_t - z_b}\right)\right) & 0 & \sin\left(\tan^{-1}\left(\frac{x_t - x_b}{z_t - z_b}\right)\right) \\ 0 & 1 & 0 \\ -\sin\left(\tan^{-1}\left(\frac{x_t - x_b}{z_t - z_b}\right)\right) & 0 & \cos\left(\tan^{-1}\left(\frac{x_t - x_b}{z_t - z_b}\right)\right) \end{bmatrix} \times P'_t \quad (6)$$

Based on equations (3) and (6), the point Pt″ can be given by equation (7) as follows:

$$P_t'' = M_{roty} \times P_t' = M_{roty} \times M_{rotx} \times P_t \quad (7)$$

$$= \begin{bmatrix} \cos\left(\tan^{-1}\left(\frac{x_t-x_b}{z_t-z_b}\right)\right) & \sin\left(\tan^{-1}\left(\frac{x_t-x_b}{z_t-z_b}\right)\right)\sin\left(\tan^{-1}\left(\frac{y_t-y_b}{z_t-z_b}\right)\right) & \sin\left(\tan^{-1}\left(\frac{x_t-x_b}{z_t-z_b}\right)\right)\cos\left(\tan^{-1}\left(\frac{y_t-y_b}{z_t-z_b}\right)\right) \\ 0 & \cos\left(\tan^{-1}\left(\frac{y_t-y_b}{z_t-z_b}\right)\right) & -\sin\left(\tan^{-1}\left(\frac{y_t-y_b}{z_t-z_b}\right)\right) \\ \sin\left(\tan^{-1}\left(\frac{x_t-x_b}{z_t-z_b}\right)\right) & \cos\left(\tan^{-1}\left(\frac{x_t-x_b}{z_t-z_b}\right)\right)\sin\left(\tan^{-1}\left(\frac{y_t-y_b}{z_t-z_b}\right)\right) & \cos\left(\tan^{-1}\left(\frac{x_t-x_b}{z_t-z_b}\right)\right)\cos\left(\tan^{-1}\left(\frac{y_t-y_b}{z_t-z_b}\right)\right) \end{bmatrix} \times$$

$$\begin{pmatrix} x_t - x_b \\ y_t - y_b \\ z_t - z_b \end{pmatrix} + \begin{pmatrix} x_b \\ y_b \\ z_b \end{pmatrix}$$

In this way, the vertical position of the wire electrode 4 can be calculated by obtaining the rotation matrices. Further, the tilt of the workpiece 3 can be changed by using the angles θrotx and θroty obtained in the above processes as tilt amounts. Thus, the tilt of the workpiece 3 to be machined can be changed with the wire electrode 4 held in the vertical direction.

The following is a description of how the problems of the prior art are solved.

(1) The machining speed cannot be increased due to difficulties in discharging sludge.

Figure 4A:
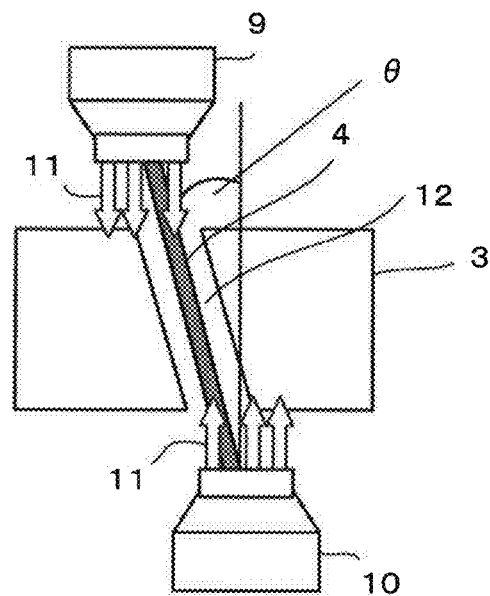
FIGS. 4A and 4B are diagrams illustrating discharge of sludge from machined grooves.
Figure 4B:
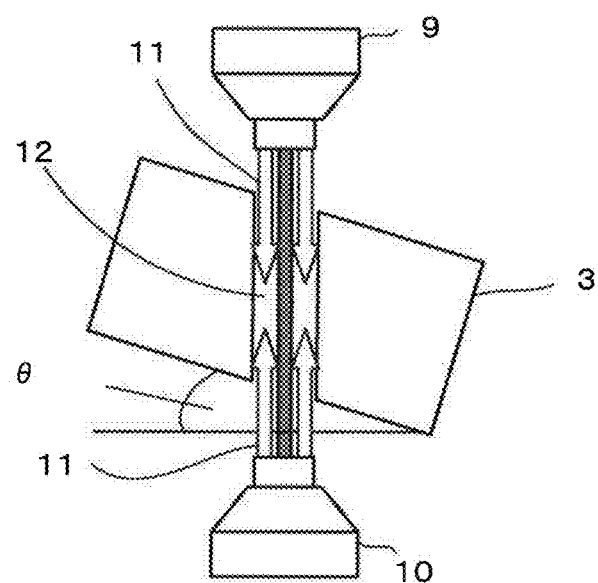

FIGS. 4A and 4B are diagrams illustrating discharge of sludge from machined grooves. In a conventional taper machining method, as shown in FIG. 4A, the wire electrode 4 is tilted at an angle equal to the taper angle to the direction perpendicular to a table surface. Therefore, the orientation of the wire electrode 4 is not coincident with the jetting direction of a working fluid, so that the working fluid cannot easily flow into the machined grooves. Thus, the sludge cannot be efficiently discharged.

In the taper machining method according to at least one embodiments of the present invention, on the other hand, a workpiece is tilted at an angle equal to the taper angle from a table surface, as shown in FIG. 4B, though the positional relationship the wire electrode and the workpiece is the same as in the conventional taper machining. Since a wire electrode 4 is located in the direction perpendicular to the table surface, however, the working fluid smoothly flows into the machined grooves as in the case of the vertical machining. Accordingly, the sludge can be efficiently discharged. Thus, the problem (1) can be solved.

(2) A wire guide portion applies frictional force, thereby adversely affecting the surface roughness.

Figure 5A:
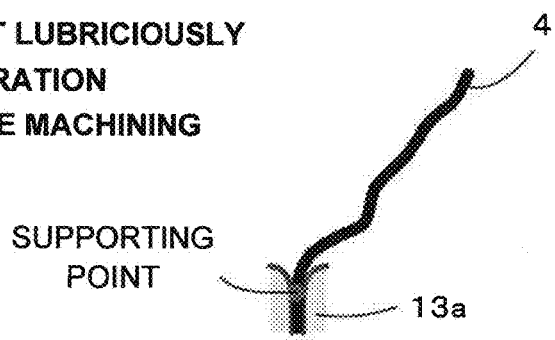
FIGS. 5A and 5B are diagrams illustrating how the wire electrode are bent at a guide portion.

In the conventional taper machining technique, as shown in FIG. 5A, the wire electrode 4 is drastically bent at the wire guide portion, so that it may fail to smoothly move in wire guide holes and may be caused to vibrate. In some cases, therefore, the wire electrode 4 may be broken and a machined surface may be streaked and degraded in smoothness. If the wire electrode 4 can be held perpendicular to the table surface, however, it can be prevented from being drastically bent at the wire guide portion. Thus, the problem (2) can be solved.

(3) Since supporting points of the wire electrode bent by the wire guide portion vary depending on the shape precision of the guide portion and the machining state, high-precision is difficult.

Figure 5B:
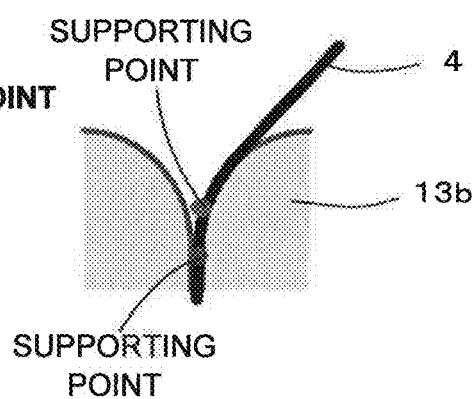
Figure 6:
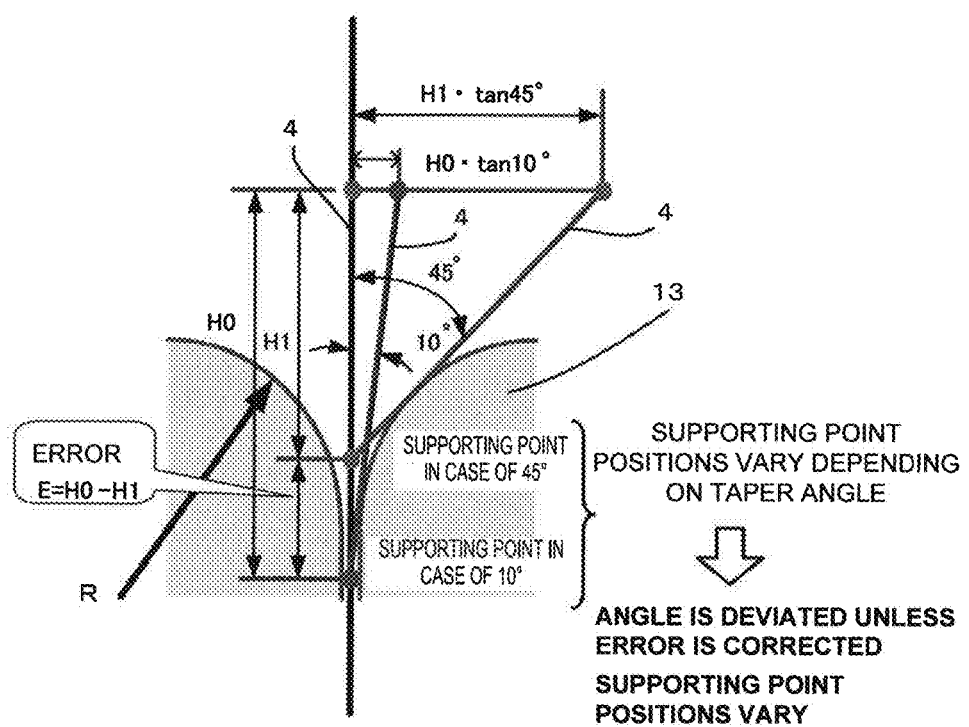
FIG. 6 is a diagram illustrating a supporting point error of a large-radius guide.

If a wire guide 13b with a large radius of curvature is used to overcome the problem (2), as shown in FIG. 5B, a supporting point error, a new problem related to precision, occurs, as shown in FIG. 6. However, the problem (3) is solved as the problem (2) is solved as described above.

(4) It is difficult to set machining conditions.

While machining conditions for vertical machining are usually provided for each plate thickness of the workpiece 3 in the wire electric discharge machining, those for taper machining are not provided. This is because it is very difficult to determine optimum machining conditions for the taper machining.

Figure 7A:
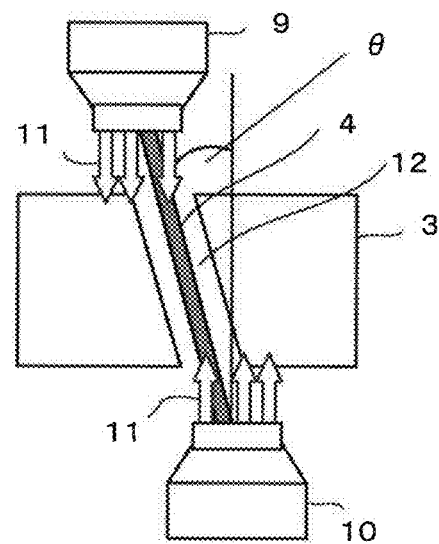
FIGS. 7A and 7B are diagrams illustrating a method of setting the plate thickness as one of machining conditions.
Figure 7B:
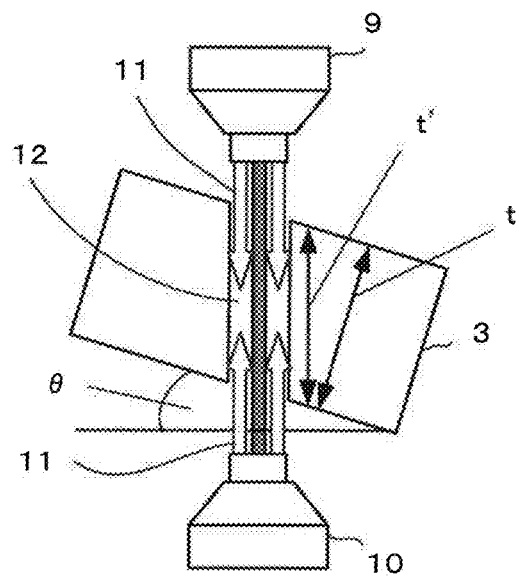

According to at least one embodiments of the present invention, in contrast, the wire electrode 4 is located vertically. If the original plate thickness of the workpiece 3 is t, based on a plate thickness t′ for machining, as shown in FIG. 7B, the following equation (8) holds. FIG. 7A is a diagram illustrating the conventional taper machining, and FIG. 7B is a diagram illustrating the taper machining.

$$t' = t/\cos\theta \quad (8)$$

Thus, the machining conditions for the taper machining can be obtained by calculating the plate thickness t′ for the taper machining of at least one embodiments of the present invention, based on the plate thickness and taper angle of the workpiece 3, and setting the machining conditions for the vertical machining for the plate thickness t′. In this way, the problem (4) can be solved.

Figure 8:
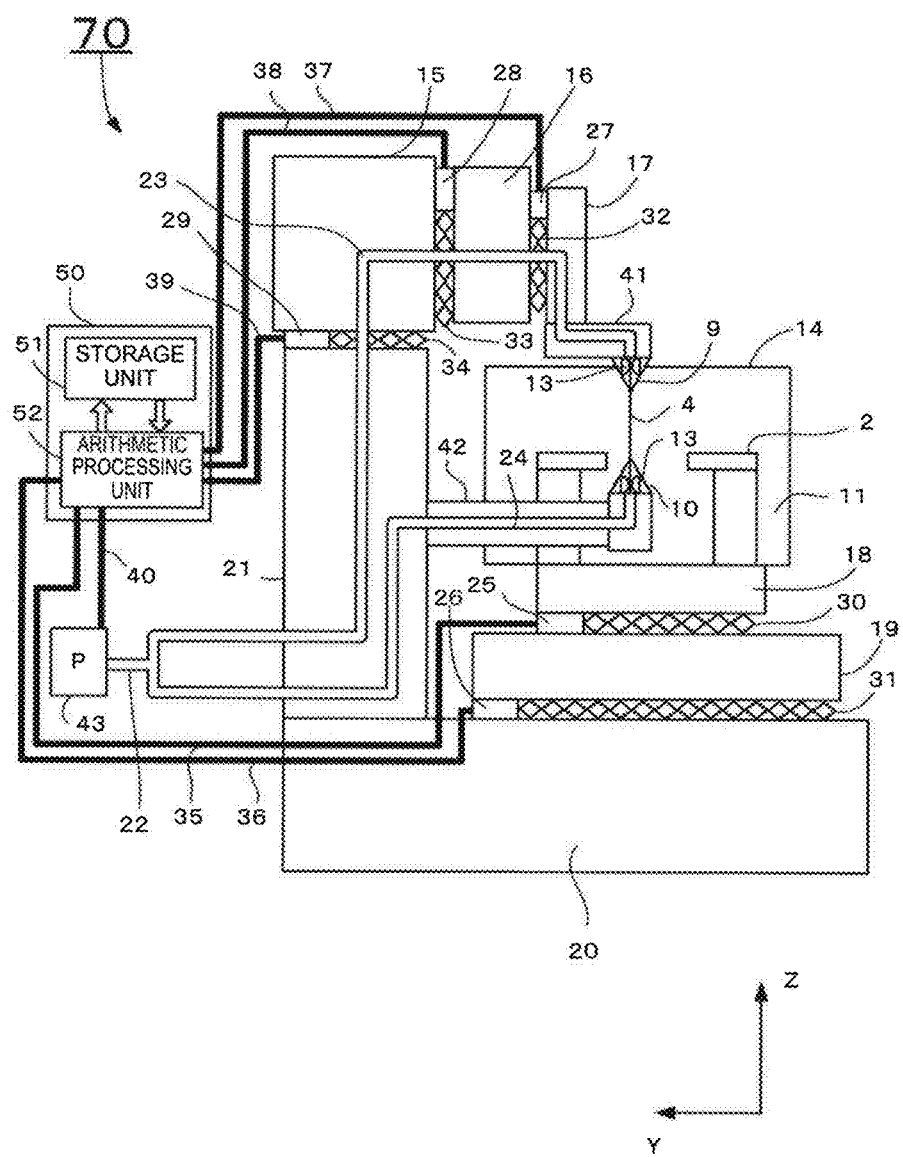
FIG. 8 is a diagram illustrating one embodiment of an electric discharge machine for taper machining.

The following is a description of a configuration example of a wire electric discharge machine for carrying out the taper machining method described above. FIG. 8 is a diagram illustrating the electric discharge machine for the taper machining.

A wire electric discharge machine 70 is configured to machine the workpiece 3 by generating electric discharge between the wire electrode 4 and the workpiece 3. The discharge machine 70 comprises an X-axis saddle 19 that overlies a base 20 and is moved in the X-axis direction by a ball screw 31 that is driven by an X-axis motor 26. A Y-axis saddle 18 overlies the X-axis saddle 19 and is moved in the Y-axis direction by a ball screw 30 that is driven by a Y-axis motor 25. As shown in FIG. 8, a working tank 14 is secured on the Y-axis saddle 18. The working tank 14 comprises a table 2 on which a loading device 44 is to be mounted.

A column 21 is set upright on the base 20. A lower arm 42 is horizontally mounted on a flank part of the column 21. A lower nozzle 10 and a guide 13 are mounted on the distal end of the lower arm 42. The lower nozzle 10 and the guide 13 are located below the table 2. The column 21 is provided with a V-axis saddle 15 on its top. The V-axis saddle 15 is moved in the direction of a V-axis by a ball screw 34 that is driven by a V-axis motor 29. The V-axis direction is coincident with the Y-axis direction. A U-axis table 16 is mounted on the V-axis saddle 15. The U-axis table 16 is moved by a ball screw 33 that is driven by a U-axis motor 28. The U-axis direction is coincident with the X-axis direction.

An upper arm supporting member 17 is mounted on the U-axis table 16. The supporting member 17 is moved in the Z-axis direction by a ball screw 32 that is driven by a Z-axis motor 27. An upper arm 41 is secured to the upper arm supporting member 17. An upper nozzle 9 and the guide 13 are mounted on an end portion of the upper arm 41. The Y-axis motor 25, X-axis motor 26, Z-axis motor 27, U-axis motor 28, and V-axis motor 29 are connected to a control device 50 by power/signal lines 35, 36, 37, 38 and 39, respectively. These motors are supplied with electric power from the control device 50 with an amplifier (not shown) and transmit and receive various signals to and from the control device 50. In FIG. 8, the X- and U-axes extend perpendicular to the drawing plane, the Y- and V-axes extend transversely, and the Z-axis extends vertically.

Figure 9A:
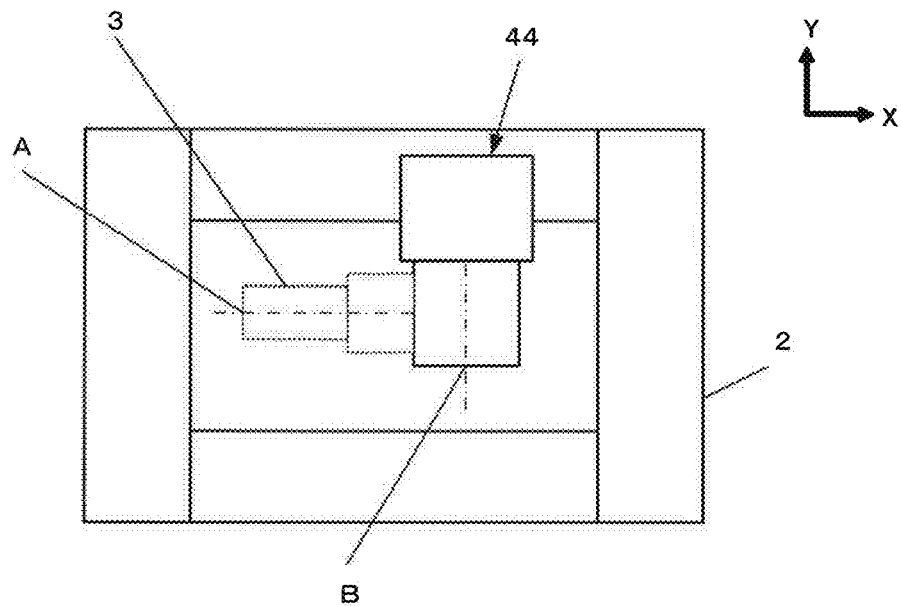
FIGS. 9A and 9B are views illustrating a workpiece loading device.
Figure 9B:
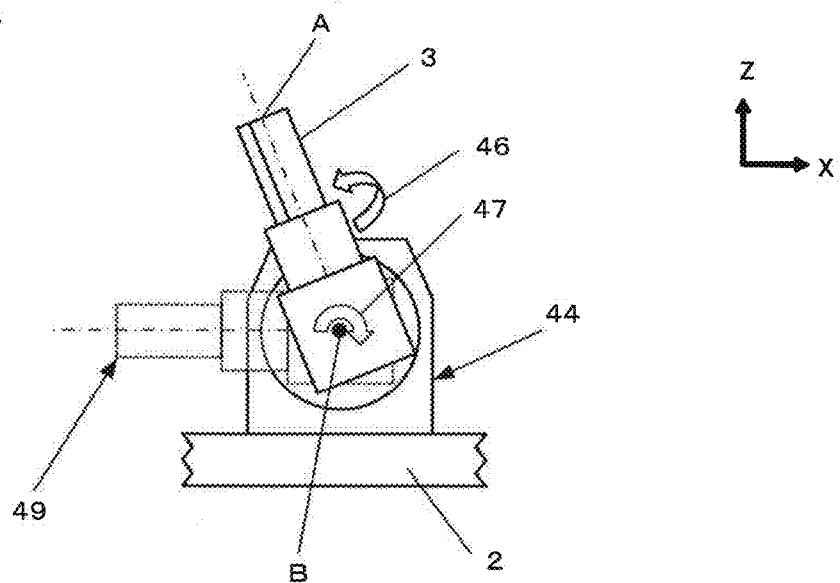

The working tank 14 is mounted on the Y-axis saddle 18. The table 2 is disposed in the working tank 14. The loading device on which the workpiece 3 is mounted, which will be described with reference to FIGS. 9A and 9B, is secured to the table 2. Electric discharge machining is performed with a working fluid 11 stored in the working tank 14. The upper nozzle 9 serves to jet the working fluid against the lower part of the workpiece 3. The guide 13 in the upper nozzle 9 supports the wire electrode 4 at the upper part of the workpiece 3, while the guide 13 in the lower nozzle 10 supports the wire electrode 4 at the lower part of the workpiece 3.

The wire electric discharge machine 70 performs electric discharge machining using the working fluid 11 between the wire electrode 4 and the workpiece 3. For stable electric discharge machining, a working fluid pump 43 draws up the working fluid 11 from a reservoir (not shown) and jets it out under high pressure from the upper and lower nozzles 9 and 10 to a machined part through a branch pipe 22 and pipes 23 and 24. Sludge in machined grooves 12 is blown off by the jetted working fluid 11 as the wire electric discharge machining is performed.

The working fluid pump 43 is connected to the control device 50 with the amplifier (not shown) by power/signal lines 40 and is drivingly controlled by the control device 50. Electric power is supplied from the control device 50 to the working fluid pump 43 so that signals are transferred between the control device 50 and the working fluid pump 43. The working fluid pump 43 supplies the working fluid 11 to the upper nozzle 9 through the pipes 22 and 23 and to the lower nozzle 10 through the pipes 22 and 24. The working fluid 11 is jetted from the upper and lower nozzles 9 and 10 to the machined part during the electric discharge machining.

The control device 50 is a device for generally controlling the wire electric discharge machine and comprises a storage unit 51 stored with various data, as well as an arithmetic unit, display unit, input/output interfaces for various signals, and amplifier (none of which is shown in FIG. 8). Those elements not shown in FIG. 8 are generally referred to as an arithmetic processing unit 52.

FIGS. 9A and 9B are views illustrating the workpiece loading device. The loading device 44 on which the workpiece 3 is mounted comprises pivots A and B. The pivots A and B are driven by servomotors (not shown), that is, A- and B-axis motors, respectively. The A- and B-axis motors for driving the pivots A and B, like the motors for the other movement axes, are drivingly controlled by the control device 50 shown in FIG. 8.

If the pivot B is tilted at a certain angle, the pivot A has a rotation axis parallel to the X-axis. The pivot B has a rotation axis parallel to the Y-axis. The pivot A is mounted on the pivot B. The workpiece 3 is secured to the pivot A. If the pivot B is rotated, the pivot A thereon rotates itself as indicated by an arrow 47. If the pivot A is rotated, the workpiece 3 rotates as indicated by an arrow 46. In this arrangement, the tilt of the workpiece can be arbitrarily changed. The storage unit 51 of the control device 50 is stored with parameters related to the machine configuration of the loading device 44 with the pivots A and B.

The following is a description of a machining program creating device used for a wire electric discharge machine, which is furnished with a loading unit capable of arbitrarily tilting the workpiece using two or more pivots, and configured to create a program for machining performed while changing the tilt of the workpiece relative to the wire electrode.

Figure 10:
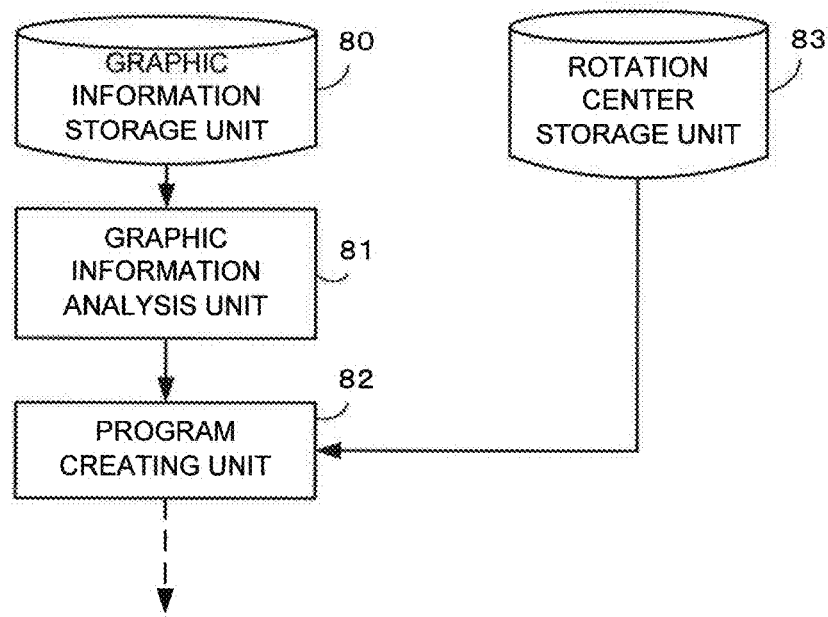
FIG. 10 is a block diagram illustrating one embodiment of the present invention.

FIG. 10 is a block diagram illustrating one embodiment of the present invention. Graphic information storage unit 80 is stored with a number of pieces of graphic information for machining. Graphic information analysis unit 81 analyzes graphic information assigned by an operator or the like, extracts data for a machining shape, and delivers these data to program creating unit 82. Rotation center storage unit 83 is stored with a number of pieces of information for the rotation center lines of the pivots. The program creating unit 82 receives the machining shape data from the graphic information analysis unit 81 and the pivot axis information from the rotation center storage unit 83 and creates a machining program 84 based on the received data.

The graphic information is previously stored in the graphic information storage unit 80 by the operator. Also, the rotation centers of the pivots are previously set and stored in the rotation center storage unit 83 by the operator. If the operator selects the necessary graphic information from the graphic information storage unit 80, the selected graphic information is delivered from the graphic information storage unit 80 to the graphic information analysis unit 81.

The graphic information analysis unit 81 analyzes the graphic information assigned by the operator or the like, extracts necessary machining shape data for the creation of the machining program, and delivers these data to the program creating unit 82. The program creating unit 82 receives the machining shape data from the graphic information analysis unit 81 and the pivot axis information from the rotation center storage unit 83. Based on the received data, the program creating unit 82 generates a new amount of movement of the wire electrode relative to the workpiece and the amounts of rotation of the pivots, used to machine the workpiece with the wire electrode held vertical, and the machining program 84 for commanding these movement and rotation amounts.

In the configuration described above, the graphic information analysis unit 81 analyzes the graphic information assigned by the operator or the like, based on the graphic information stored in the graphic information storage unit 80. Alternatively, however, a graphic information reader (not shown) may be used to externally read the graphic information.

Figure 11:
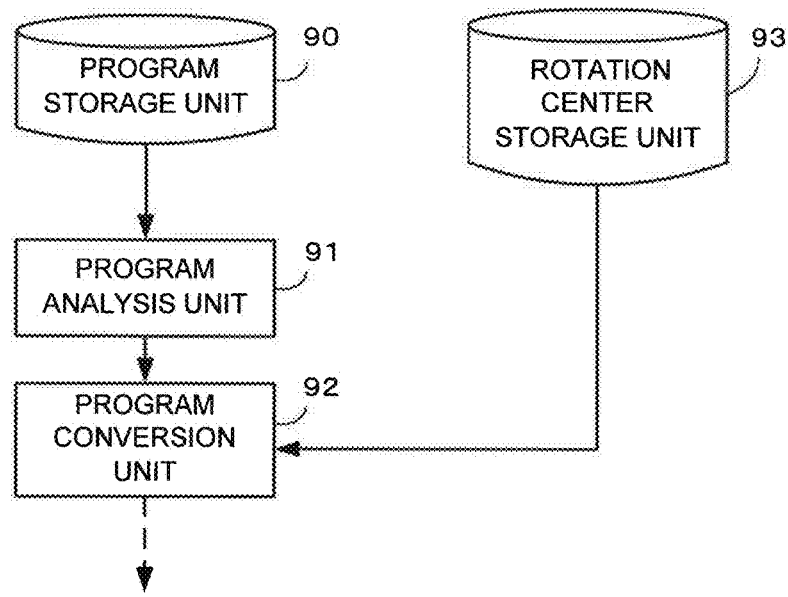
FIG. 11 is a block diagram illustrating another embodiment of the present invention.
Figure 12:
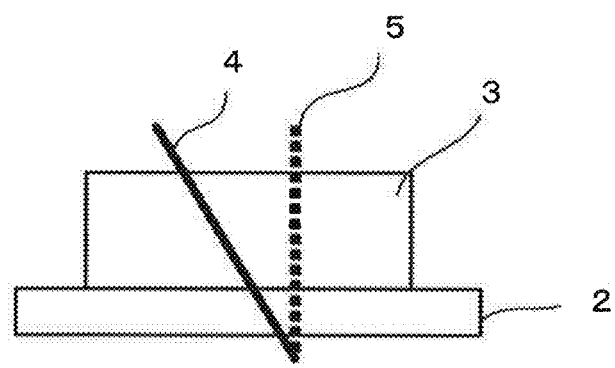
FIG. 12 is a diagram illustrating taper machining in conventional wire electric discharge machining.

FIG. 11 is a block diagram illustrating a second embodiment of the present invention. Program storage unit 90 is stored with a number of necessary programs for machining. Program analysis unit 91 analyzes programs assigned by an operator or the like and delivers them to program conversion unit 92. Rotation center storage unit 93 is stored with a number of pieces of information for the rotation center lines of pivots. The program conversion unit 92 receives a tilt command for a wire electrode and a command for the movement of the wire electrode relative to a workpiece from the program analysis unit 91 and the pivot axis information from the rotation center storage unit 93 and creates a machining program 94 based on the received data.

The machining programs are previously stored in the program storage unit 90 by the operator. Also, the rotation centers of the pivots are previously set and stored in the rotation center storage unit 93 by the operator. If the operator selects the necessary machining program from the program storage unit 90, the selected machining program is delivered from the program storage unit 90 to the program analysis unit 91. The program analysis unit 91 analyzes the machining programs assigned by the operator or the like, extracts the tilt command for the wire electrode and the command for the movement of the wire electrode relative to the workpiece from the machining programs, and delivers these commands to the program conversion unit 92.

The program conversion unit 92 receives the tilt command for the wire electrode and the command for the movement of the wire electrode relative to the workpiece from the program analysis unit 91 and the pivot axis information from the rotation center storage unit 93. Based on the received data, the program conversion unit 92 converts the tilt command for the wire electrode and the command for the movement of the wire electrode relative to the workpiece to a command for the movement of the wire electrode relative to the workpiece and commands for the rotation of the pivots.

In the configuration described above, the program analysis unit 91 analyzes the machining programs assigned by the operator or the like from the machining programs stored in the program storage unit 90. Alternatively, however, a machining program reader may be used to externally read the machining programs.

The invention claimed is:

1. A machining program creating device for a wire electric discharge machine,
   wherein the wire electric discharge machine comprises:
      at least two linear axes for relative movement of a table and a wire electrode, and
      a loading device mounted on the table, the loading device being configured to be fitted with a workpiece to be machined, and the loading device including at least two pivots,
   the machining program creating device comprising a processor configured to:
      receive input of graphic data defining a product shape,
      set machining data including at least the thickness of the product shape and an amount of tilt of the wire electrode, and
      create a machining program according to which, (a) a new amount of movement of the wire electrode relative to the workpiece and (b) amounts of rotation of the pivots, to machine the workpiece with the wire electrode held vertically, are generated based on
         (1) the amount of tilt of the wire electrode,
         (2) amounts of movement of the linear axes for moving the wire electrode relative to the workpiece, and
         (3) previously stored rotation center lines of the pivots,
      wherein the new amount of movement of the wire electrode relative to the workpiece and the amounts of rotation of the pivots are commanded to change a tilt of the workpiece relative to the wire electrode for machining by synchronously moving the linear axes and the pivots based on the created machining shape.

2. The machining program creating device according to claim 1, wherein
   the processor is further configured to obtain a rotation matrix based on the amounts of tilt of the rotation center lines and the wire electrode relative to a vertical line, and
   the new amount of movement of the wire electrode relative to the workpiece and the amounts of rotation of the pivots are obtained based on the rotation matrix.

3. A machining program creating device for a wire electric discharge machine,
   wherein the wire electric discharge machine comprises:
      at least two linear axes for relative movement of a table and a wire electrode, and
      a loading device mounted on the table, the loading device being configured to be fitted with a workpiece to be machined, and the loading device including at least two pivots,
   the machining program creating device comprising a processor configured to:
      receive input of a machining program; and
      convert (a) a tilt command for the wire electrode and (b) a command for the movement of the wire electrode relative to the workpiece to (i) a different command for the movement of the wire electrode relative to the workpiece and (ii) commands for the rotation of the pivots, based on
         (1) an amount of tilt of the wire electrode in the input machining program,
         (2) amounts of movement of the linear axes for moving the wire electrode relative to the workpiece, and
         (3) previously stored rotation center lines of the pivots,
      wherein a tilt of the workpiece relative to the wire electrode is changed for machining by synchronously moving the linear axes and the pivots.

4. The machining program creating device according to claim 1, wherein the processor is further configured to
   analyze graphic information in the input graphic data,
   extract, from the analyzed graphic information, data for the product shape, and
   use the extracted data to create the machining program.

5. The machining program creating device according to claim 4, wherein the graphic information is externally assigned or stored in a storage device.

6. The machining program creating device according to claim 3, wherein the processor is further configured to
   analyze the input machining program, and
   use the analyzed machining program for the conversion.

7. The machining program creating device according to claim 6, wherein the machining program is externally assigned or stored in a storage device.

* * * * *